(12) United States Patent
Stevens

(10) Patent No.: US 6,674,846 B1
(45) Date of Patent: Jan. 6, 2004

(54) METHOD AND SYSTEM FOR MODEM PULSE DIALING IN A TELECOMMUNICATION SYSTEM

(75) Inventor: Ronald Dennis Stevens, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/359,584

(22) Filed: Jul. 22, 1999

(51) Int. Cl.[7] ............................................. H04M 11/00
(52) U.S. Cl. .................................... 379/93.28; 379/362
(58) Field of Search .......................... 379/93.28, 93.29, 379/93.31, 93.01, 93.08, 100.15, 362, 359

(56) References Cited

U.S. PATENT DOCUMENTS

| | | | | |
|---|---|---|---|---|
| 3,869,578 A | * | 3/1975 | Epstein ........................... | 179/2 |
| 4,723,267 A | * | 2/1988 | Jones et al. .................... | 379/93 |
| 5,170,470 A | * | 12/1992 | Pindar et al. ................... | 379/13 |
| 5,627,539 A | * | 5/1997 | Lynch et al. ................... | 341/155 |
| 6,546,091 B1 | * | 4/2003 | Wehmeyer et al. ...... | 379/93.28 |

* cited by examiner

*Primary Examiner*—Stella Woo
(74) *Attorney, Agent, or Firm*—Procopio, Cory, Hargreaves & Savitch, LLP

(57) ABSTRACT

The method and system determines if modem pulse dialing has been requested in a telecommunication system having both a modem and an associated modem driver. When modem pulse dialing is requested, a fast timer is activated by the modem driver in association with a slow timer in the modem by stopping the fast timer, calculating a divisor value to set-up an interrupt period for the pulse dialing and restarting the fast timer utilizing the interrupt period. The fast timer is started and stopped by enabling/disabling timer interrupts. By synchronizing the fast timer and the slow timer to count in millisecond increments with the modem continuously operating utilizing both the slow timer and the fast timer, the timer resolution necessary for modem pulse dialing is produced. The modem releases control to the operating system during inter-digit delay time.

20 Claims, 2 Drawing Sheets

METHOD AND SYSTEM FOR MODEM PULSE DIALING IN A TELECOMMUNICATION SYSTEM

BACKGROUND OF THE INVENTION

1. Field of the Invention

The present invention relates to a method and system for modem pulse dialing in a telecommunication system in general, and in particular a method for modem pulse dialing in a Windows NT 4.0 environment.

2. Description of Related Art

Modem customers in areas without tone dialing require a modem that supports pulse dialing. Pulse dialing consists of sending a series of pulses for each digit dialed. In countries such as Japan, for example, it is common to use a 50 millisecond pulse 10 (FIG. 1) consisting of a 33.5 millisecond part 12 and a 16.5 millisecond part 14. To accomplish this, driver software must be able to start one part of the pulse at time zero and then wait until time one to terminate that part and start the second part. This cycle repeats for each pulse by waiting until the next time zero, and continuing until all pulses have been sent. However, in some operating systems and more particularly in Windows NT 4.0, two obstacles must be overcome to solve this problem. The first is the system clock, which cannot easily be configured to measure in units smaller than ten milliseconds. The second is the system task scheduler, which cannot be configured to start waiting software tasks in units smaller than ten milliseconds.

Therefore, a need exists in operating systems such as Windows NT 4.0 that do not offer an adequate precise timing source to its device drivers, to be equipped to do the type of real-time rapid response timing control to accomplish proper pulse dialing. The method and system of the present invention solves all these problems in a new and unique manner.

SUMMARY OF THE INVENTION

The method and system first determines if modem pulse dialing has been requested in a telecommunication system having both a modem and an associated modem driver. Next, when modem pulse dialing is requested, a fast timer is activated by the modem driver in association with a slow timer in the modem by stopping the fast timer, calculating a divisor value to set-up an interrupt period for the pulse dialing and restarting the fast timer utilizing the interrupt period. The fast timer is started and stopped by enabling/ disabling timer interrupts. By synchronizing the fast timer and the slow timer to count in millisecond increments with the modem continuously operating utilizing both the slow timer and the fast timer, the timer resolution necessary for completing the modem pulse dialing is produced. The modem releases control to the operating system during inter-digit delay time.

BRIEF DESCRIPTION OF THE DRAWINGS

The general purpose of this invention, as well as a preferred mode of use, its objects and advantages will best be understood by reference to the following detailed description of an illustrative embodiment with reference to the accompanying drawings in which like reference numerals designate like parts throughout the figures thereof, and wherein.

DETAILED DESCRIPTION OF THE PREFERRED EMBODIMENTS

Figure 1:
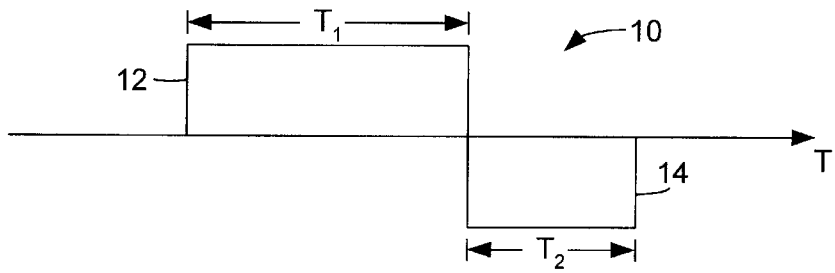
FIG. 1 illustrates a signal pulse format utilized for modem pulse dialing.

Referring now to the drawings, FIG. 1 shows a typical pulse 10 used for modem pulse dialing. Modem pulse dialing utilizes a fixed milliseconds pulse consisting of a first milliseconds pulse 12 of break time and a second millisecond pulse 14 of make time for completing the modem pulse dialing. As shown in FIG. 1, the first millisecond pulse 12 is larger than the second millisecond pulse 14. To do pulse dialing, the modem breaks and makes a relay connection to count one pulse. Usually the modem will send one pulse to dial a "1", two pulses for a "2", and so on, and waiting between numbers. This can be heard on a rotary phone as a series of clicks for each number, with a quiet period between numbers.

In the US, and in US-like phone systems, a pulse is usually 100 milliseconds, 60 milliseconds of relay break time and 40 milliseconds of relay make time, with a delay of 750 milliseconds between numbers. In Japan and in other non-US phone systems, a pulse may be 50 milliseconds, consisting of 33 milliseconds break time and 17 milliseconds make time. Therefore, non-US modem's handle pulse dialing by starting a timer when it breaks the relay, and then making the relay when the timer expires, continuing for each pulse of the current number, when it sets another timer to wait to pulse the next number. This works under Windows 95/98 because the system timer has a resolution of 1 ms, allowing it to measure time to the nearest one millisecond.

Figure 3:
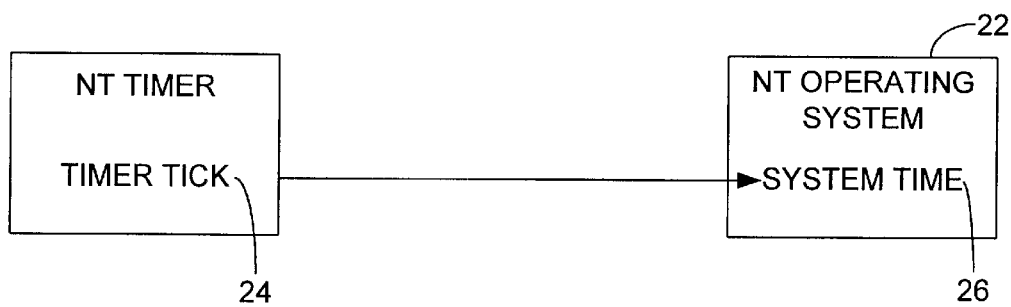
FIG. 3 is a block diagram showing a current Windows NT 4.0 timing solution.

However, under some operating systems and more particularly Windows NT 4.0, the timer has a resolution of 10 milliseconds, which allows the modem to measure times only to the nearest 10 milliseconds. Referring to FIG. 3, the NT operating system 22 only gives a timer interrupt tick 24 based on a system time 26 of 10 milliseconds which is not finite enough for non-US based modem pulse dialing systems.

Figure 2:
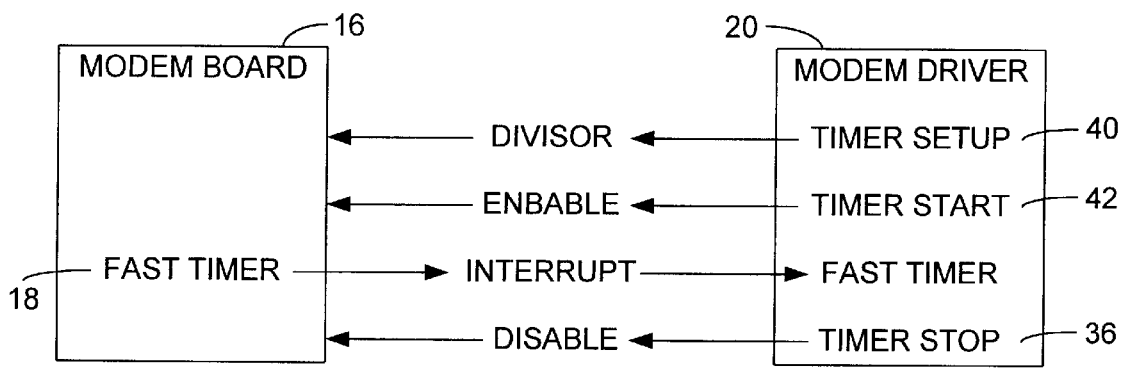
FIG. 2 is a block diagram showing a fast timer in a modem and software routines in a modem driver for use in a telecommunications system in accordance with the present invention.

Referring to FIG. 2, in accordance with the present invention, for a modem to support pulse dialing in a system like Windows NT 4.0 which have slower system times, the NT modem driver 20 augments the system timer by providing an additional timer 18 on the modem board 16. This additional timer is referred to as the fast timer 18 and is programmed in the operating system having the modem driver 20 software to update a tick counter every 1 millisecond. When the modem 16 asks for the system time, the NT driver 20 utilizes the fast timer 18 to add ticks to the last known time (which updated as the last 10 milliseconds timer tick), giving times to 1 millisecond accuracy.

In accordance with one embodiment of the present invention, the NT 4.0 driver uses a HCF programmable timer, configuring it to interrupt every millisecond. This provides the required precise timing source. Next, at each pulse dial start, the NT 4.0 driver 20 starts a system task that runs continuously during both parts of each pulse while counting 1 millisecond for each timer interrupt until the proper time expires. This provides the precise timing required to send out the first part 12 and second part 14 of each pulse. At the end of each pulse, the driver releases control to the operating system to provide the user with the proper mouse and keyboard control and feedback. This solves the problem by providing highly precise pulses for use in dialing the phone, without sacrificing system responsiveness.

It is important to note the modem 16 is required to be in a continuous loop, checking for timer ticks as they occur. If the modem 16 is not in a loop, it will be scheduled to run once every 10 ms, defeating the purpose of the fast tick counter. To accomplish pulse dialing without locking out the mouse and keyboards or otherwise perturbing the system, the modem 16 runs in its continuous loop during the pulses and releases control to the operating system during the inter-digit delay time. The timer 18 can be programmed to interrupt at any arbitrary time by calculating a divisor value, but the modem 16 selects one millisecond for easy calculating at run time.

Figure 4:
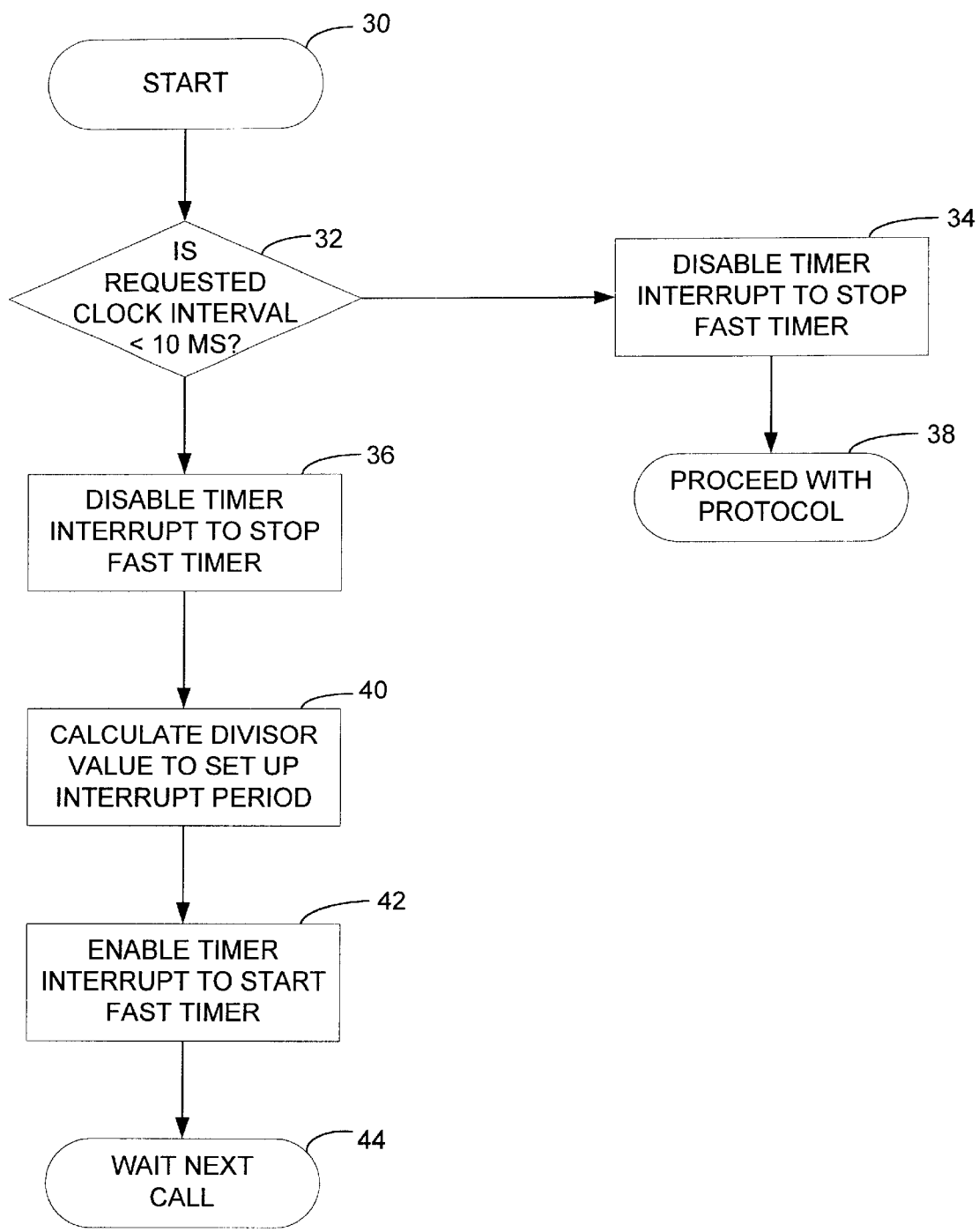
FIG. 4 is a flowchart illustrating a process to set a fast timer to count in one-millisecond intervals in accordance with the present invention.

Referring now to FIGS. 2 and 4, the modem driver 20 located in the operating system controls the timer using "stop" 36, "program" 40 and "start" 42 routines. As shown in FIG. 4, the modem driver starts at step 30 by checking to see if the requested call is modem pulse dialing of less than 10 milliseconds in step 32. If it is, a stop routine stops the fast timer 18 in step 36 by disabling the timer interrupt. Next, in step 40, the program routine sets up the interrupt period by calculating a divisor value. The hardware timer decrements a counter 55,125 times per second, using a timer signal derived by dividing the board's 28.224 MHz clock by 512. The modem 18 programs this interval counter to generate a periodic interrupt. To generate one interrupt per second, the modem 18 would set the value 55125 into the counter. To generate an interrupt once per millisecond, the modem 18 would use $\frac{1}{1000}^{th}$ of this value, or 55.125, rounded to 55. To expand on this, to cause the interrupt to happen every "n" milliseconds, the routine would calculate an interrupt divisor value as follows:

(28,224,000/512)/(1000/9)=496.13
(28,224,000/512)/(1000/8)=441.00
(28,224,000/512)/(1000/7)=385.88
(28,224,000/512)/(1000/6)=330.75
(28,224,000/512)/(1000/5)=275.63
(28,224,000/512)/(1000/4)=220.50
(28,224,000/512)/(1000/3)=165.38
(28,224,000/512)/(1000/2)=110.25
(28,224,000/512)/(1000/1)=55.13

The modem driver 20 uses this pre-calculated divisor (approx. 55) to implement timer ticks ranging from 1–9 ms.

In step 42, the fast timer 18 is started by enabling the interrupt and uses this interrupt period. The timer resolution is always set every time modem pulse dialing is requested due to the variety of dialing schemes utilizing different millisecond intervals (e.g. 2, 5 10, etc.) The routine therefore waits in step 44 for the next call or modem pulse dialing request. If the requested call was not less than 10 milliseconds in step 32, the fast timer 18 is stopped by disabling the timer interrupt and the required protocol for the call's format is proceeded with to completion in step 38.

In summary, the modem 16 determines if modem pulse dialing is requested in a telecommunication system having a modem 16 and an associated modem driver 20 and in response to the modem pulse dialing request, configures a fast timer 18 by the modem driver 20 to interrupt every millisecond. The modem driver 20 synchronizes the fast timer 18 and the slow timer 24 to count in millisecond increments. The modem 16 continuously operates or loops during the modem pulse dialing for producing timer resolution necessary for completing the modem pulse dialing and releasing control to the operating system during inter-digit delay time. The fast timer and slow timer run continuously, they must be reset when the operating system register overflows.

While the invention has been particularly shown and described with reference to a preferred embodiment, it will be understood by those skilled in the art that various changes in form and detail may be made therein without departing from the spirit and scope of the invention.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A method for modem pulse dialing in a telecommunication system, comprising the steps of:

determining if modem pulse dialing is being requested in a telecommunication system having a modem and an associated modem driver; and responsive to the modem pulse dialing request, activating a fast timer in the modem driver in association with a slow timer in the modem whereby the modem continuously operates utilizing both the slow timer and the fast timer for producing a timer resolution necessary for completing the modem pulse dialing.

2. The method for modem pulse dialing according to claim 1, further comprising the step of:

configuring the fast timer by the modem driver to interrupt every millisecond.

3. The method for modem pulse dialing according to claim 1, further comprising the step of:

synchronizing the fast timer and the slow timer to count in millisecond increments.

4. The method for modem pulse dialing according to claim 1, further comprising the step of:

continuously operating the modem during modem pulse dialing and releasing control to an operating system during inter-digit delay time.

5. The method for modem pulse dialing according to claim 1, further comprising the step of:

stopping the fast timer by disabling a timer interrupt when pulse dialing is required.

6. The method for modem pulse dialing according to claim 5, further comprising the step of:

calculating a divisor value to set-up an interrupt period for the pulse dialing.

7. The method for modem pulse dialing according to claim 6, further comprising the step of:

starting the fast timer by enabling the interrupt utilizing the interrupt period.

8. The method for modem pulse dialing according to claim 1, further comprising the step of:

utilizing a fixed millisecond pulse consisting of a first millisecond pulse of break time and a second millisecond pulse of make time for completing the modem pulse dialing wherein the first millisecond pulse is larger than the second millisecond pulse.

9. The method for modem pulse dialing according to claim 1, further comprising the step of:

instructing the modem driver to set-up pulse dialing parameters for completing the modem pulse dialing.

10. The method for modem pulse dialing according to claim 1, further comprising the steps of:

resetting the fast timer and the slow timer when the operating system timer register overflows.

11. A system for modem pulse dialing in a telecommunication system, comprising:

means for determining if modem pulse dialing is requested in a telecommunication system having a modem and an associated modem driver; and means for activating a fast timer in the modem driver in association with a slow timer in the modem whereby the modem continuously operates utilizing both the slow timer and the fast timer for producing a timer resolution necessary for completing modem pulse dialing.

12. The system according to claim 11, further comprising:

means for configuring the fast timer to interrupt every millisecond.

13. The system according to claim 11, further comprising:

means for synchronizing the fast timer and the slow timer to count in millisecond increments.

14. The system according to claim 11, further comprising:

means for continuously operating the modem during modem pulse dialing and means for releasing control to an operating system during inter-digit delay time.

15. The system according to claim 11, further comprising:

means for stopping the fast timer when pulse dialing is required.

16. The system according to claim 15, further comprising:

means for calculating a divisor value to set-up an interrupt period for the pulse dialing.

17. The system according to claim 16, further comprising:

means for starting the fast timer utilizing the interrupt period.

18. The system according to claim 11, further comprising:

means for utilizing a fixed millisecond pulse consisting of a first millisecond pulse of break time and a second millisecond pulse of make time for completing the modem pulse dialing wherein the first millisecond pulse is larger than the second millisecond pulse.

19. The system for modem pulse dialing according to claim 11, further comprising:

means for resetting the fast timer and the slow timer when the operating system timer register overflows.

20. A method for modem pulse dialing in a telecommunication system, comprising the steps of:

determining if modem pulse dialing is requested in a telecommunication system having a modem and an associated modem driver; and responsive to the modem pulse dialing request, activating a fast timer in the modem driver in association with a slow timer in the modem;

stopping the fast timer by disabling a timer interrupt when the pulse dialing is required;

calculating a divisor value to set-up an interrupt period for the pulse dialing;

starting the fast timer by enabling the interrupt utilizing the interrupt period;

synchronizing the fast timer and the slow timer to count in millisecond increments whereby the modem continuously operates utilizing both the slow timer and the fast timer for producing a timer resolution necessary for completing the modem pulse dialing; and releasing control to an operating system during inter-digit delay time.

* * * * *